United States Patent
Lindoff et al.

(10) Patent No.: US 10,623,125 B2
(45) Date of Patent: Apr. 14, 2020

(54) RESOURCE UTILIZATION FOR UPLINK TRANSMISSION BASED ON INDICATED INTERFERENCE

(71) Applicant: Telefonaktiebolaget LM Ericsson (publ), Stockholm (SE)

(72) Inventors: Bengt Lindoff, Bjarred (SE); Leif Wilhelmsson, Dalby (SE); Imadur Rahman, Sollentuna (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 16/442,502

(22) Filed: Jun. 15, 2019

(65) Prior Publication Data
US 2019/0305866 A1 Oct. 3, 2019

Related U.S. Application Data

(62) Division of application No. 15/030,048, filed as application No. PCT/EP2013/071620 on Oct. 16, 2013, now Pat. No. 10,326,545.

(51) Int. Cl.
*H04J 11/00* (2006.01)
*H04W 72/08* (2009.01)
(Continued)

(52) U.S. Cl.
CPC ........... *H04J 11/0056* (2013.01); *H04J 11/00* (2013.01); *H04L 5/14* (2013.01); *H04L 5/16* (2013.01);
(Continued)

(58) Field of Classification Search
None
See application file for complete search history.

(56) References Cited

U.S. PATENT DOCUMENTS

| 5,448,754 A * | 9/1995 | Ho ...................... H04B 1/1027 |
| | | 455/454 |
| 9,433,005 B2 * | 8/2016 | Lee ......................... H04L 5/006 |

(Continued)

FOREIGN PATENT DOCUMENTS

| CN | 101690045 A | 3/2010 |
| WO | 2009063001 A2 | 5/2009 |

(Continued)

OTHER PUBLICATIONS

PCT International Search Report, dated Jun. 16, 2014, in connection with International Application No. PCT/EP2013/071620, all pages.
(Continued)

*Primary Examiner* — Anh Ngoc M Nguyen
(74) *Attorney, Agent, or Firm* — Laffler Intellectual Property Law, PLLC

(57) ABSTRACT

According to a disclosed example, an intention of a first wireless communication device to use a first power level and a first time-frequency resource for up-link transmission to a first cellular communication network is detected. At a second wireless communication device, a signal is received from the first device indicative of up-link transmission. The second device determines whether or not an interference (caused by the up-link transmission of the first device and affecting a down-link reception of the second device from a second cellular communication network at a second power level in a second time-frequency resource) has a third power level associated with the first power level that exceeds a power level threshold associated with the second power level. The second device transmits an interference indication to the first device using a third time-frequency resource if it is determined that the third power level exceeds the power level threshold, and the interference indication is received at the first device. The first device determines whether or not to use the first time-frequency resource for up-link trans-
(Continued)

mission based on the interference indication. Corresponding computer program product, arrangements and wireless communication device are also disclosed.

7 Claims, 3 Drawing Sheets

(51) Int. Cl.
| | |
|---|---|
| *H04L 5/14* | (2006.01) |
| *H04L 5/16* | (2006.01) |
| *H04W 40/24* | (2009.01) |
| *H04W 72/04* | (2009.01) |
| *H04W 92/18* | (2009.01) |
| *H04W 84/04* | (2009.01) |

(52) U.S. Cl.
CPC ....... *H04W 40/244* (2013.01); *H04W 72/042* (2013.01); *H04W 72/0446* (2013.01); *H04W 72/082* (2013.01); *H04W 84/042* (2013.01); *H04W 92/18* (2013.01)

(56) References Cited

U.S. PATENT DOCUMENTS

| | | | |
|---|---|---|---|
| 2009/0016229 A1 | 1/2009 | Wu et al. | |
| 2009/0170542 A1 | 7/2009 | Chen et al. | |
| 2010/0142458 A1* | 6/2010 | Mark | H04W 52/143 370/329 |
| 2010/0240312 A1 | 9/2010 | Peng et al. | |
| 2012/0300662 A1 | 11/2012 | Wang et al. | |
| 2013/0078991 A1 | 3/2013 | Nam | |
| 2014/0269374 A1* | 9/2014 | Abdelmonem | H04L 5/0026 370/252 |

FOREIGN PATENT DOCUMENTS

| | | |
|---|---|---|
| WO | 2010139847 A1 | 12/2010 |
| WO | 2011088619 A1 | 7/2011 |
| WO | 2012015698 A1 | 2/2012 |

OTHER PUBLICATIONS

PCT Written Opinion, dated Jun. 16, 2014, in connection with International Application No. PCT/EP2013/071620, all pages.
Shaoyu Xu et al., "Effecitve Interference Cancellation Scheme for Device-to-Device Communication Underlaying Cellular Networks", Vehicular Technology Conference Fall (VTC 2010—Fall), 2010 IEEE 72nd, 5 pages.
Pekka Janis et al., "Interference-aware resource allocation for device-to-device radio underlaying cellular networks", 2009 IEEE 69th Vehicular Technology Converence, Apr. 26-29, 2009, Barcelona, Spain, 5 pages.
Tao Peng et al., "Interference Avoidance Mechanisms in the Hybrid Cellular and Device-to-Device Systems", IEEE 20th International Symposium on Personal, Indoor and Mobile Radio Communications (PIMRC 2009), pp. 617-621.
Xiran MA et al., "A Distributed Relay Selection Method for Relay Assisted Device-to-Device Communication System", 2012 IEEE 23rd International Symposium on Personal, Indoor and Mobile Radio Communications (PIMRC), pp. 1020-1024.
Klaus Doppler et al., "Device-to-Device Communication as an Underlay to LTE-Advanced Networks", IEEE Communications Magazine, Dec. 2009, pp. 42-49.
Yu Li et al., "Adaptive TDD UL/DL Slot Utilization for Cellular Controlled D2D Communications", Mobile Congress (GMC), 2011 Global, 6 pages.
Fei Teng et al., "Power Control Based on Interference Pricing in Hybrid D2D and Cellular Networks", globalcom Workshops 2012, International Workshop on Emerging Technologies for LTE-Advanced and Beyond-4G, pp. 676-680.
Chinese Office Action, dated Sep. 30, 2018, in connection with Chinese Application No. 201380081192.7, 4 pages.
English language translation of Chinese Search Report, dated Sep. 30, 2018, in connection with Chinese Application No. 201380081192. 7, 2 pages.
English language Summary of Chinese Office Action, dated Sep. 30, 2018, in connection with Chinese Application No. 201380081192.7, 1 page.

* cited by examiner

RESOURCE UTILIZATION FOR UPLINK TRANSMISSION BASED ON INDICATED INTERFERENCE

CROSS-REFERENCE TO RELATED APPLICATIONS

This application claims the benefit of U.S. application Ser. No. 15/030,048 filed Apr. 15, 2016 (371(c) date), which is a 35 U.S.C. § 371 national stage of international application PCT/EP2013/071620 filed Oct. 16, 2013. All of these earlier applications are hereby incorporated herein by reference in their entireties.

TECHNICAL FIELD

The present invention relates generally to the field of utilization of time/frequency resources in cellular communication systems. More particularly, it relates to utilization of resources for uplink transmission.

BACKGROUND

To distribute communication resources between downlink (DL) and uplink (UL) transmission, some wireless communication systems employ a partition of the time dimension resources and assign different time dimension resource elements to uplink and downlink transmission respectively. One example of such an approach is the Time Division Duplex (TDD) operation of the Third Generation Partnership Project (3GPP) standard Universal Mobile Telecommunication Standard—Long Term Evolution (UMTS LTE).

In TDD, transmission in the uplink and in the downlink is typically performed using the same carrier frequency (i.e. uplink and downlink share the same carrier frequency). This is in contrast to Frequency Division Duplex (FDD) operation where different carriers are used for uplink and downlink transmission respectively. Thus, one advantage of TDD compared to FDD is that only one carrier is needed for communication.

Furthermore, TDD is (at least in theory) a flexible approach since allocation of the available time dimension resources (e.g. in terms of subframes of an UMTS LTE system) to uplink and downlink, respectively, may be adapted to a current situation. For example, the allocation of time dimension resources may be adapted based on a current traffic need such that—compared to a default allocation— more time dimension resources are allocated to uplink transmission if there is a need to transmit a higher than normal amount of data in the uplink and vice versa. In UMTS LTE, one example approach to flexibly allocate time dimension resources may be referred to as a dynamically reconfigurable UL/DL allocation based on instantaneous traffic.

Flexible allocation of time dimension resources may, however, result in some difficulties in a practical system implementation. FIG. 1 is a schematic drawing illustrating one such potential problem.

In FIG. 1, a first wireless communication device 101 communicates with a network node 111 of a first cellular communication network and a second wireless communication device 102 communicates with a network node 112 of a second cellular communication network. The first and second cellular communication networks may be the same cellular communication network or different cellular communication networks. If allocation of time dimension resources results in an uplink transmission 121 by the wireless communication device 101 being executed simultaneously as a downlink transmission 122 by the network node 112, there is a risk that interference 141 from the first wireless communication device 101 (caused by the uplink transmission 121) reaches the second wireless communication device 102 and (more or less severely) interferes with reception of the downlink transmission 122 at the second wireless communication device 102. The area 131 marks a "dead zone" or "coverage hole" where downlink reception is severely impaired by an uplink reception from the first wireless communication device 101.

For example, in practical TDD deployments according to UMTS LTE, the possibility to use different UL/DL subframe allocation patterns in different cells is rather limited. This is the case both for different cells using the same carrier frequency and for different cells using adjacent carrier frequencies. The limitation is (at least partly) due to the large dynamics in a communication system, where the power level of a received signal may be as low as approximately −100 dBm white the power level of a transmitted signal may be above e.g. 20 dBm (i.e. a power difference or dynamic range of 120 dB). Therefore, if one device transmits with a high power level at the same time as another device receives a signal with a low power level, the power level of the interference experienced at the receiving device may be (up to) 120 dB lager than the power level of the desired signal considering that the devices may be located close to each other.

Assuming ideal transceivers it would be possible to deploy different UL/DL allocation patterns for different cells using adjacent TDD carriers. However, due to real-world transceiver imperfections (e.g. non-linear elements) there will be leakage of the uplink signal transmitted on one of the carriers into the spectrum of the signal to be received in the other carrier (which could be adjacent). Thus, interference may typically be experienced also in adjacent channels. The UMTS LTE specification includes requirements that adjacent channel leakage should be in the range of 30-40 dB for a User Equipment (LIE). Hence, the adjacent channel interference may be (up to) 120−30=90 dB (the in-band power difference of 120 dB is reduced to 80-90 dB adjacent channel power difference if the devices are located close to each other and, thus, the path loss between them is low).

One way of attempting to avoid the situation illustrated in FIG. 1 may be by alignment of the time dimension resource allocation patterns of the base stations, which typically makes the allocation less flexible (or not flexible at all).

Another way to attempt avoidance of the situation illustrated in FIG. 1 may be by having coordination between the network nodes of the first and second cellular communication networks, which may not be possible if the network nodes do not have a suitable connection to each other (e.g. if they belong to different operators). Even if coordination is possible, there may be a lack at the allocating network node of information needed to perform the coordination efficiently (e.g. which devices are in the vicinity of the first wireless communication device 101). In such situations, the flexible allocation may be based on a worst case scenario (e.g. not allocating extra uplink slots to the first device if one or more active devices are present in the entire area covered by an adjacent network node), which typically makes the allocation too restrictive and less flexible.

WO 2009/063001 A2 discloses adaptation of allocation of up-link and down-link subframes in wireless communication systems. A control unit at a base station may detect particular problem scenarios and determine that interference between two (or more) particular mobile terminals has occurred or is likely. In one example, by comparing scheduling information, time alignment values, signal quality reports, and the like, the base station control unit may determine that two half-duplex mobile terminals connected to the serving base station are transmitting similar SIR values and have similar timing alignment such that a transmission for one terminal coincides with reception at another terminal. In this case, a new uplink downlink subframes allocation pattern is sent to at least one of the mobile terminals. This approach is only possible for terminals connected to the same serving base station and when the control unit has access to the scheduling information, etc. of both the terminals.

Thus, if flexible allocation of time dimension resources results in a situation where uplink transmission is performed by a first wireless communication device in a first cellular communication network and the uplink transmission may cause interference at a second wireless communication device during downlink reception by the second wireless communication device in a second cellular communication network, there is a risk of the flexible allocation of time dimension resources causing problems to the communication in the second cellular communication network.

Such a situation may arise, for example, when the first wireless communication device performs uplink transmission in a time dimension resource that is normally allocated for downlink transmission which results in the allocation patterns of the base station being non-aligned.

An alternative or additional example of the above situation arising is when time dimension resource allocation patterns of the base stations communicating, respectively, with the first and second wireless communication devices are not coordinated. This may be the case, for example, if the first and second cellular communication networks belong to different operators. Then, the interference may occur at the adjacent channel in the worst case.

A yet alternative or additional example of the above situation arising is when there is no information at an allocating network node (e.g. the network node 111 of FIG. 1) regarding distances between a device to be allocated extra uplink resources (e.g. the first wireless communication device 101 of FIG. 1) and other devices that may be interfered by transmission using the extra uplink resources. This may be the case, for example, if the necessary system information cannot be exchanged between the network nodes of the first and second cellular communication networks. Therefore, even if there is some allocation pattern coordination between network nodes, such coordination may be ineffective due to lack of the distance information above.

Therefore, there is a need for methods and devices that enable flexible time dimension resource allocation while managing potential interference caused by the flexibility.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to obviate at least some of the above disadvantages and to provide methods and devices that enable flexible time dimension resource allocation while managing potential interference caused by the flexibility.

According to a first aspect, this is achieved by a method for a first wireless communication device adapted to communicate with a first cellular communication network.

The method comprises detecting an intention of the first wireless communication device to use a first power level and a first time-frequency resource for up-link transmission to the first cellular communication network.

The method also comprises receiving an interference indication from a second wireless communication device in a third time-frequency resource. The interference indication is indicative of whether or not an interference (caused by the up-link transmission of the first wireless communication device using the first power level and the first time-frequency resource and affecting a down-link reception of the second wireless communication device from a second cellular communication network at a second power level in a second time-frequency resource) has a third power level associated with the first power level that exceeds a power level threshold associated with the second power level.

The method further comprises determining whether or not to use the first time-frequency resource for up-link transmission based on the interference indication.

Determining whether or not to use the first time-frequency resource for up-link transmission may, for example, comprise determining to use the first time-frequency resource for up-link transmission or determining to not use the first time-frequency resource for up-link transmission. Determining to not use the first time-frequency resource for up-link transmission may comprise one or more of determining to seize using the first time-frequency resource for up-link transmission, determining to avoid using the first time-frequency resource for up-link transmission, and determining to prevent (or prohibit) use of the first time-frequency resource for up-link transmission.

The interference may be an expected interference or an actual interference. The up-link transmission causing the interference may be commenced (or started) before or after receiving the interference indication. If the up-link transmission causing the interference is commenced after receiving the interference indication, the interference may be an expected interference caused by the up-link transmission, which may be an intended up-link transmission. If the up-link transmission causing the interference is commenced before receiving the interference indication, the interference may be an expected or an actual interference.

That the third power level (of the interference) is associated with the first power level (of the up-link transmission) may comprise that the third power level is equal to a scaling factor (i.e. a third power level scaling factor) multiplied with the first power level. The third power level scaling factor may be based on (e.g. equal to) a path loss between the first and second wireless communication devices. Alternatively or additionally, the third power level scaling factor may be based on (e.g. equal to) a leakage factor between a frequency band used by the first wireless communication device and a frequency band used by the second wireless communication device.

That the power level threshold is associated with the second power level may comprise that the power level threshold equals an interference power value that renders performance of a simultaneous reception of a desired signal (i.e. the down-link reception) at the second power level unacceptable. For example, the power level threshold may have a value equal to the second power level divided by a signal-to-interference ratio (SIR), or divided by a similar measure (e.g. a signal-to-noise ratio (SNR) or a signal-to-interference-and-noise ratio (SINR). Alternatively, the power level threshold may have a value corresponding to an interference power value where a block error rate (BLER) or bit error rate (BER) of the down-link reception falls above an acceptable error rate threshold. The second power level may be a second received power level.

The down-link reception may comprise any down-link reception, for example, reception of down-link data, down-link control signaling, synchronization signals, pilot symbols, reference signals, and/or up-link scheduling grants.

According to some embodiments, detecting the above-identified intention may comprise receiving an up-link allocation of the first time-frequency resource from (a network node of) the first cellular communication network.

According to some embodiments, detecting the above-identified intention may comprise the first wireless communication device autonomously determining to employ the first time-frequency resource for up-link transmission (and possibly informing the first cellular communication network of the determination).

Detecting the intention of the first wireless communication device to use a first power level and a first time-frequency resource for up-link transmission to the first cellular communication network may, according to some embodiments, comprise the first wireless communication device detecting a need for increased up-link resource allocations, transmitting a corresponding request to a network node of the first cellular communication network, and receiving an up-link allocation from a network node of the first cellular communication network.

According to some embodiments, the method may further comprise starting the up-link transmission using the first power level and the first time-frequency resource before receiving the interference indication, and stopping the up-link transmission using the first power level and the first time-frequency resource if it is deter mined, based on the interference indication, to not use the first time-frequency resource for up-link transmission.

In some embodiments, the method may further comprise starting the up-link transmission using the first power level and the first time-frequency resource if it is determined, based on the interference indication, to use the first time-frequency resource for up-link transmission.

The method may, according to some embodiments, further comprise monitoring the third time-frequency resource after detecting the intention.

In some embodiments, the method may further comprise transmitting a beacon signal using a fourth power level associated with the first power level in a fourth time-frequency resource after detecting the intention, and monitoring the third time-frequency resource after transmitting the beacon signal. In such embodiments, receiving the interference indication may be performed in response to transmitting the beacon signal.

The beacon signal may, for example, comprise data information and/or synchronization symbols.

That the fourth power level is associated with the first power level may comprise that the fourth power level is equal to the first power level multiplied with a scaling factor (i.e. a fourth power level scaling factor). The fourth power level scaling factor may be based or (e.g. equal to) a path loss between the first and second wireless communication devices and/or a path loss difference between a carrier frequency used for the up-link transmission and a carrier frequency used for the beacon transmission. Alternatively or additionally, the third power level scaling factor may be based on (e.g. equal to) a leakage factor between a frequency band used by the first wireless communication device and a frequency band used by the second wireless communication device.

The third and/or fourth power levels may correspond to (e.g. be equal to) a power level of the (expected or actual) interference (caused by the first wireless communication device) experienced at the second wireless communication device in the second time-frequency resource.

According to some embodiments, the method may comprise determining to not use the first time-frequency resource for up-link transmission if the interference indication is received. In such embodiments, the method may comprise determining to use the first time-frequency resource for up-link transmission if the interference indication is not received.

According to some embodiments, the method may comprise determining to use the first time-frequency resource for up-link transmission if the interference indication is not received, and if the interference indication is received it may be determined whether or not to use the first time-frequency resource for up-link transmission based on the content of the interference indication. For example, the interference indication may have a first value if the third power level of the interference exceeds the power level threshold and a second value if the third power level of the interference does not exceed the power level threshold. In such embodiments, it may be determined to not use the first time-frequency resource for up-link transmission if the interference indication has the first value and to use the first time-frequency resource for up-link transmission if the interference indication has the second value.

The method may, in some embodiments, further comprise (if it is determined to not use the first time-frequency resource for up-link transmission) transmitting a report indicative of the determination to the first cellular communication network.

The first and second cellular communication networks may be the same or different cellular communication networks. In some embodiments, the first and second cellular communication networks are networks of a first operator and a second operator, respectively, where the first and second operators are different operators.

At least one of the first and second cellular communication networks may be compliant with UMTS LTE according to some embodiments.

The first, second, third and fourth time-frequency resources may be any combination of any suitable time resource and any suitable frequency resource. For example, a time resource may comprise a (time) slot, a (time) frame, or a subframe, and a frequency resource may comprise a frequency band, a carrier frequency, and/or a set of carrier frequencies. In a typical example, a time-frequency resource may be a resource element and/or a set of resource elements of UMTS LTE.

Typically, the first, second, third and fourth time-frequency resources are different time-frequency resources (i.e. at least one of the time and the frequency of the resource differs from the time and the frequency of the other resources). In some examples, the first and second time-frequency resources comprise different times and may or may not share frequency. In some examples, the third and fourth time-frequency resources comprise different times and may or may not share frequency.

In some embodiments, the first and second time-frequency resources comprise resources of a cellular communication system (e.g. the system used in the first and second cellular communication networks) and the third and fourth time-frequency resources comprise one or more of resources of a cellular communication system (e UMTS LTE), or other wireless communication resources such as device-to-device (D2D) communication resources (e.g. Bluetooth, WiFi Direct, network assisted D2D, Wireless Local Area Network—WLAN, etc.).

According to a second aspect, a method is provided for a second wireless communication device adapted to communicate with a second cellular communication network.

The method comprises receiving (from a first wireless communication device) a signal indicative of up-link transmission by the first wireless communication device to a first cellular communication network using a first power level and a first time-frequency resource.

The method also comprises deter whether or not an interference (caused by the up-link transmission of the first wireless communication device using the first power level and the first time-frequency resource and affecting a down-link reception of the second wireless communication device from a second cellular communication network at a second power level in a second time-frequency resource) has a third power level associated with the first power level that exceeds a power level threshold associated with the second power level. Determining whether or not the interference has the third power level that exceeds the power level threshold may be based on the received signal.

The method further comprises transmitting an interference indication to the first wireless communication device using a third time-frequency resource if it is determined that the third power level of the interference exceeds the power level threshold.

According to some embodiments, the method may comprise transmitting the interference indication to the first wireless communication device also if it is determined that the third power level of the interference does not exceed the power level threshold. In some embodiments, the interference indication may have a first value if the third power level of the interference exceeds the power level threshold and a second value if the third power level of the interference does not exceed the power level threshold.

In some embodiments, the method may comprise not transmitting any interference indication to the first wireless communication device if it is determined that the third power level of the interference does not exceed the power level threshold.

In some embodiments, the signal indicative of the up-link transmission may comprise a beacon signal received in a fourth time-frequency resource. In such embodiments, the method may further comprise (first) detecting impaired down-link reception at the second power level in the second time-frequency resource by the second wireless communication device and monitoring the fourth time-frequency resource (in response to detecting impaired down-link reception). Then, the beacon signal may be received during or in response to the monitoring of the fourth time-frequency resource.

In some embodiments (e.g. if the first wireless communication device of the first aspect commences the up-link transmission causing the interference may before receiving the interference indication), the signal indicative of the up-link transmission may comprise the up-link transmission itself.

According to some embodiments, the method may further comprise transmitting a report indicative of the determination to the second cellular communication network if it is determined that the interference has the third power level that exceeds the power level threshold.

It should be noted that a wireless communication device may be adapted to perform one or both of the method according to the first aspect and the method according to the second aspect.

A third aspect is a computer program product comprising a computer readable medium, having thereon a computer program comprising program instructions, the computer program being loadable into a data-processing unit and adapted to cause the data-processing unit to execute method steps according to the first and/or second aspect when the computer program is run by the data-processing unit.

A fourth aspect is an arrangement for a first wireless communication device adapted to communicate with a first cellular communication network. The arrangement comprises a detector, a transmitter, a receiver and a determiner.

The detector is adapted to detect an intention of the first wireless communication device to use a first power level and a first time-frequency resource for up-link transmission to the first cellular communication network.

The transmitter is adapted to perform the up-link transmission using the first power level and the first time-frequency resource.

The receiver is adapted to receive an interference indication from a second wireless communication device in a third time-frequency resource, wherein the interference indication is indicative of whether or not an interference (caused by the up-link transmission of the first wireless communication device using the first power level and the first time-frequency resource and affecting a down-link reception of the second wireless communication device from a second cellular communication network at a second power level in a second time-frequency resource) has a third power level associated with the first power level that exceeds a power level threshold associated with the second power level.

The determiner is adapted to determine whether or not to use the first time-frequency resource for up-link transmission based on the interference indication.

The receiver may be adapted to receive the interference indication in response to the detector detecting the intention. Alternatively or additionally, the receiver may be adapted to receive the interference indication in response to the transmitter performing the up-link transmission or in response to the transmitter transmitting a beacon signal.

In some embodiments, the arrangement may further comprise a controller.

The controller may be adapted to cause the transmitter to start the up-link transmission using the first power level and the first time-frequency resource responsive to the detector detecting the intention to use the first power level and the first time-frequency resource for up-link transmission, and to cause the transmitter to stop the up-link transmission using the first power level and the first time-frequency resource responsive to the determiner determining, based on the interference indication, to not use the first time-frequency resource for up-link transmission.

Alternatively or additionally, the controller may be adapted to cause the transmitter to start the up-link transmission using the first power level and the first time-frequency resource responsive to the determiner determining, based on the interference indication, to use the first time-frequency resource for up-link transmission.

The arrangement may, according to some embodiments, further comprise a monitor adapted to monitor the third time-frequency resource responsive to the detector detecting the intention.

The transmitter may, in some embodiments, be further adapted to transmit a beacon signal using a fourth power level associated with the first power level in a fourth time-frequency resource responsive to the detector detecting the intention. In such embodiments, the arrangement may further comprise a monitor adapted to monitor the third time-frequency resource responsive to the transmitter transmitting the beacon signal.

According to a fifth aspect, an arrangement is provided for a second wireless communication device adapted to communicate with a second cellular communication network. The arrangement comprises a receiver, a determiner and a transmitter.

The receiver is adapted to receive (from a first wireless communication device) a signal indicative of up-link transmission by the first wireless communication device to a first cellular communication network using a first power level and a first time-frequency resource.

The determiner is adapted to determine whether or not an interference (caused by the up-link transmission of the first wireless communication device using the first power level and the first time-frequency resource and affecting a down-link reception of the second wireless communication device from a second cellular communication network at a second power level in a second time-frequency resource) has a third power level associated with the first power level that exceeds a power level threshold associated with the second power level.

The transmitter is adapted to transmit an interference indication to the first wireless communication device using a third time-frequency resource responsive to the determiner determining that the interference has the third power level that exceeds the power level threshold.

In some embodiments, the signal indicative of the up-link transmission may comprise a beacon signal received in a fourth time-frequency resource and the arrangement may further comprise a detector and a monitor. The detector may be adapted to detect impaired down-link reception at the second power level in the second time-frequency resource by the second wireless communication device. The monitor may be adapted to monitor the fourth time-frequency resource in response to the detector detecting the impaired down-link reception.

A sixth aspect is an arrangement for a wireless communication device comprising the arrangement for the first wireless communication device of the fourth aspect and the arrangement for the second wireless communication device of the fifth aspect.

A seventh aspect is a wireless communication device comprising the arrangement of any of the fourth, fifth and sixth aspects.

In some embodiments, the fourth aspect may additionally have features identical with or corresponding to any of the various features as explained above for the first aspect. Similarly, the fifth aspect may additionally have features identical with or corresponding to any of the various features as explained above for the second aspect.

An advantage of some embodiments is that flexible time dimension resource allocation is enabled while managing potential interference caused by the flexibility.

Another advantage of some embodiments is that increased network efficiency may be achieved. The increased network efficiency may be due to the possibility to flexibly allocate time dimension resources. The increased network efficiency may (alternatively or additionally) be due to the provided interference control mechanism. The increased network efficiency may (yet alternatively or additionally) be due to that a decision of whether or not to use an allocated resource is based on an actual (or predicted) interference situation instead of basing allocation decisions on a worst case situation.

BRIEF DESCRIPTION OF THE DRAWINGS

Further objects, features and advantages will appear from the following detailed description of embodiments, with reference being made to the accompanying drawings, in which.

DETAILED DESCRIPTION

Figure 1:
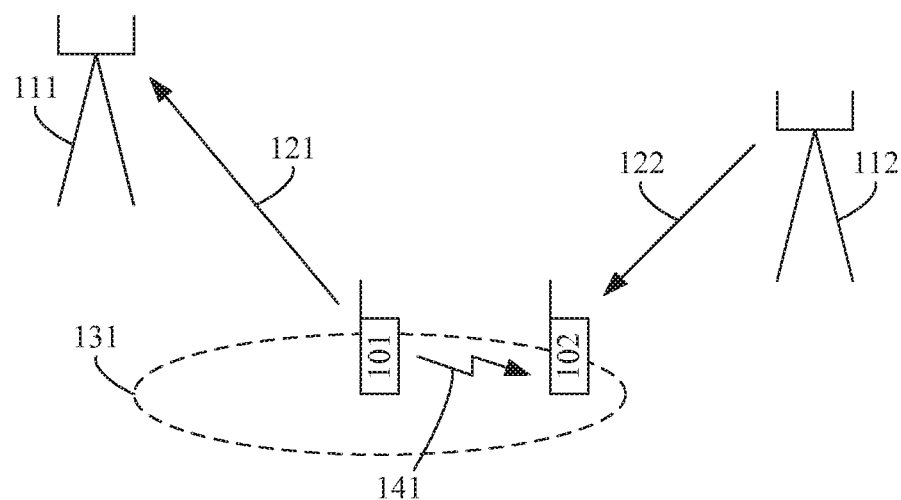
FIG. 1 is a schematic drawing of an example scenario according to some embodiments.

The notations "device" and "wireless communication device" will be used interchangeably herein.

UMTS LTE may be used as an example in this disclosure. However, embodiments may be equally applicable to other existing or future cellular communication systems (e.g. Global System for Mobile communication (GSM), UMTS, or High Speed Packet Access (HSPA)).

In the following, embodiments will be described where flexible time dimension resource allocation is made possible while managing potential interference caused by the flexibility.

Various embodiments may be particularly useful if the flexible allocation of time dimension resources results in a situation where uplink transmission is performed by a first wireless communication device in a first cellular communication network and the uplink transmission may cause interference at a second wireless communication device during downlink reception by the second wireless communication device in a second cellular communication network. In such situations, some embodiments may eliminate or at least mitigate interference caused by the uplink transmission in the first cellular communication network and affecting the downlink reception in the second cellular communication network.

In some embodiments, it is detected whether there are any (second) devices in the vicinity of a first device, wherein the first device needs to transmit using a time-frequency resource for cellular communication where there is a risk of causing significant interference to the other (second) devices cellular communication reception. The vicinity (or proximity) detection may be based on measurements or estimations of the propagation attenuation (path loss) between the first and second devices. The detection may utilize D2D communication.

According to some embodiments, an intention of a first wireless communication device to use a first power level and a first time-frequency resource for up-link transmission to a first cellular communication network is detected and a signal indicative of up-link transmission (e.g. the uplink transmission itself or a beacon signal) from the first device is received at a second wireless communication device. The second device determines whether or not an interference (caused by the up-link transmission of the first device and affecting a down-link reception of the second device from a second cellular communication network at a second power level in a second time-frequency resource) has a third power level associated with the first power level that exceeds a power level threshold associated with the second power level, and transmits an interference indication to the first device using a third time-frequency resource if it is determined that the third power level exceeds the power level threshold. Thereafter, the first device determines whether or not to use the first time-frequency resource for up-link transmission based on the interference indication.

Thus, an extra uplink resource allocated to a device is typically only used if the corresponding uplink transmission does not cause interference to downlink reception of nearby devices, which reduces the interference in the systems. Furthermore, the flexible resource allocation does not have to be designed for worst case scenarios, and, thus, extra uplink resources may be allocated more often than in a worst case scenario based approach, which increases system efficiency.

Figure 2:
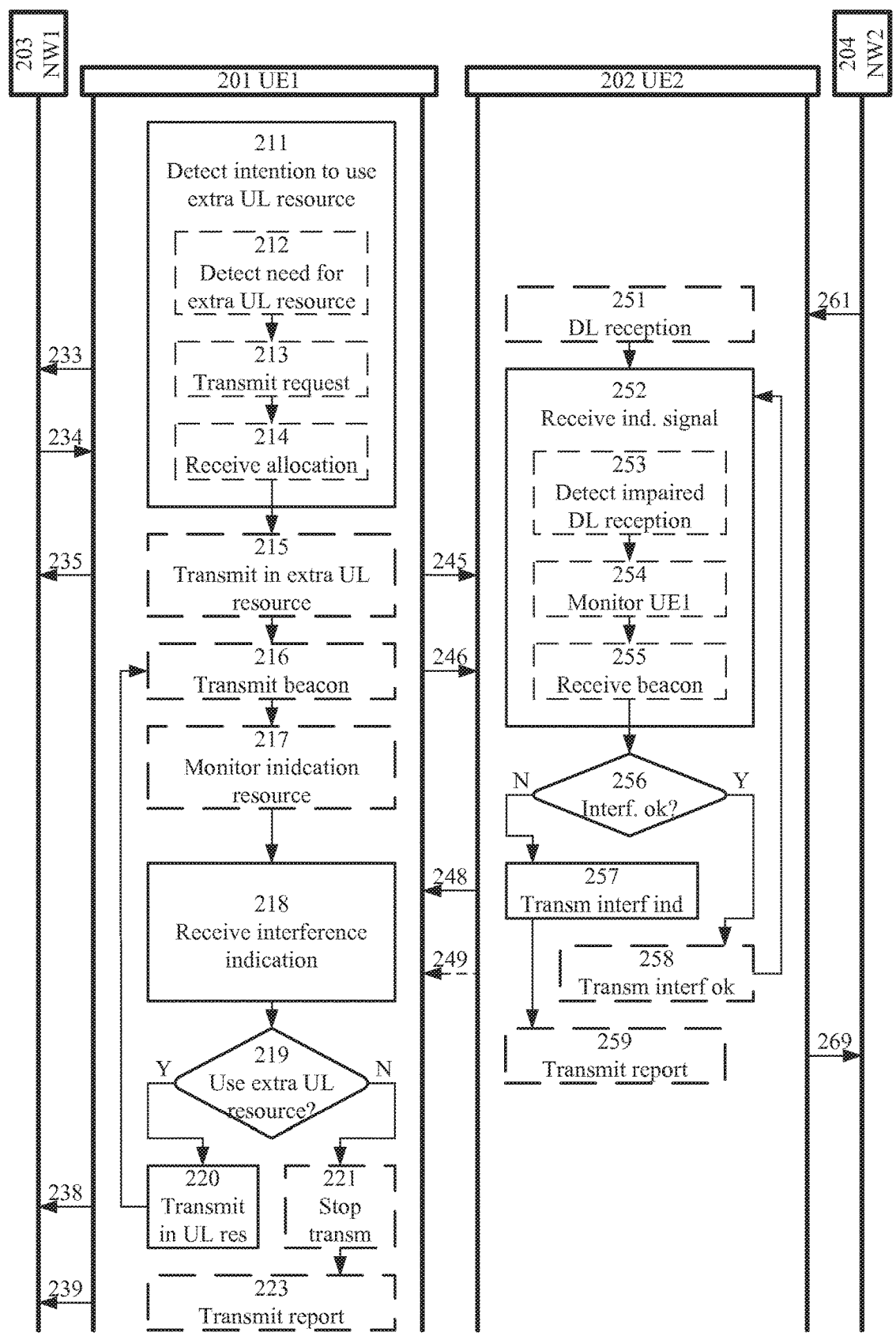
FIG. 2 is a combined flowchart and signaling diagram illustrating example method steps and signals according to some embodiments.

FIG. 2 is a combined flowchart and signaling diagram illustrating example method steps and signals according to some embodiments. Each method step is executed by either of a first wireless communication device (UE1) 201 (compare with the first wireless communication device 101 of FIG. 1) and a second wireless communication device (UE2) 202 (compare with the second wireless communication device 102 of FIG. 1). Each signaling event takes place between the first device 201 and the second device 202, between the first device 201 and a network node (NW1) 203 of a first cellular communication network (compare with network node 111 of FIG. 1), or between the second device 202 and a network node (NW2) 204 of a second cellular communication network (compare with network node 112 of FIG. 1).

In step 211, UE1 detects an intention to use an extra uplink resource (i.e. a first power level and a first time-frequency resource for up-link transmission to the first cellular communication network).

Detecting the above-identified intention in step 211 may comprise receiving an up-link allocation 234 from NW1 as illustrated by sub-step 214.

Alternatively, detecting the above-identified intention in step 211 may comprise UE1 autonomously determining to employ the extra uplink resource (and possibly informing NW1 of the determination).

Alternatively or additionally, detecting the above-identified intention in step 211 may comprise detecting a need for increased up-link resource allocations (sub-step 212), transmitting a corresponding request 233 to NW1 (sub-step 213), and receiving an up-link allocation 234 from NW1 (sub-step 214).

Then, UE1 performs one or both of starting the up-link transmission 235 (also reaching UE2 as interference 245) using the extra uplink resource according to step 215 and transmitting a beacon signal 246 according to step 216. The beacon may be transmitted using a fourth power level in a fourth time-frequency resource (e.g. a D2D time-frequency resource). The fourth power level of the beacon may be associated with the first power level of the up-link transmission. For example, the power level of the beacon may be selected such that the power level of the beacon, when it is received at UE2, corresponds to the power level of the up-link transmission induced interference when it is received at UE2 (i.e. the third power level). The beacon may be indicative of the first time-frequency resource and/or of the first power level.

According to one example the power level of the beacon may be selected according to the following approach, e.g. if D2D communication is used for transmission of the beacon (and possibly for transmission of the interference indication). A suitable path loss model (e.g. that the power at a distance r from a transmitter equals $P_{tx}/r^3$ where $P_{tx}$ is the output power of the transmitter) is assumed. It is also assumed that the transmit power for the cellular up-link transmission is known, and that the approximate received power level when interference caused by the up-link transmission is harmful to cellular down-link reception (in a same or different frequency interval as the up-link transmission) is known. Then, a radius may be determined of the dead zone area (compare with 131 of FIG. 1) in which down-link reception will be harmfully interfered by the interference caused by the up-link transmission. Given a known reference sensitivity level for the D2D communication, the first device may then calculate the transmission power level of the beacon such that a second device is in the dead zone area if it detects the beacon. In response to step 215 and/or in response to step 216, UE1 may monitor a resource for transmission of an interference indication 248, 249 as illustrated in step 217. The resource for transmission of the interference indication may be a third time-frequency resource (e.g. a D2D time-frequency resource).

It should be noted that a selection of the steps 215, 216 and 217 may be executed in any suitable order (e.g. 215, 216, 217; or 216, 217, 215; or 216, 215, 217; or 215, 217; or 216, 217). Furthermore, step 215 may be executed in parallel to one or more of steps 216 and 217. Other sequences of execution are also possible.

As illustrated by step 251, UE2 may be carrying out reception of downlink signaling 261 from NW2 at a second received power level in a second time-frequency resource and, in step 252, UE2 receives a signal 245, 246 indicative of the up-link transmission 235 by The signal indicative of the up-link transmission may be a beacon signal 246 (as illustrated by sub-step 255) and/or an interference 245 caused by the up-link transmission 235.

According to some embodiments, step 252 may comprise UE2 detecting impaired down-link reception (sub-step 253) and monitoring the fourth time-frequency resource (sub-step 254) in response thereto before receiving a beacon signal 246 (sub-step 255).

The down-link reception may be any applicable down-link reception (e.g. down-link data reception, reception of synchronization signals, and/or detection of downlink control signals). Thus, step 253 may, for example, comprise detecting synchronization problems.

Based on the signal(s) received in step 252, UE2 determines (in step 256) whether or not the received power level of the interference (caused by the up-link transmission of UE1 and affecting the down-link reception of UE2) exceeds a power level threshold. The power level threshold may be set in association with the power level of the received down-link signal, for example, such that the power level threshold equals an interference power value that renders down-link reception performance unacceptable.

Step 256 may, for example, comprise comparing a power level of the received interference 245 to the power level threshold. Alternatively or additionally, step 256 may comprise comparing a power level of the received beacon signal 246 to the power level threshold.

If it is determined that the power level of the interference exceeds the power level threshold (No-path out from step 256), UE2 transmits an interference indication 248 to UE1 as illustrated by step 257. The interference indication may take the form of a response signal as a reaction to a received beacon signal or may take the form of an alternative beacon signal if no beacon was transmitted by the first device. Possibly, UE2 also transmits a report 269 indicative of the determination to NW2 as illustrated by step 259.

If it is determined that the power level of the interference does not exceed the power level threshold (Yes-path out from step 256), UE2 may transmit an interference indication 249 to UE1 as illustrated by step 258, wherein the interference indication 249 has another content than the interference indication 248 and is indicative of the power level of the interference not exceeding the power level threshold. Alternatively, UE2 may not transmit any interference indication at all to UE1 if it is determined that the power level of the interference does not exceed the power level threshold (Yes-path out from step 256).

The resource for transmission of the interference indication 248, 249 may be the third time-frequency resource (e.g. a D2D time-frequency resource).

In step 218, UE1 receives the interference indication 248, 249 transmitted by UE2 and in step 219 UE1 determines whether or not to use the extra up-link resource based on the interference indication.

If it is determined to use the extra up-link resource (Yes-step out from step 219), UE1 may start up-link transmission 238 accordingly as illustrated in step 220 (or continue up-link transmission if up-link transmission has already been started in step 215).

If it is determined to not use the extra up-link resource (No-step out from step 219), UE1 may prohibit up-link transmission in the extra up-link resource (or stop up-link transmission if up-link transmission has already been started in step 215, as illustrated in step 221).

In step 223, UE1 may transmit a report 239 to NW1 indicative of the determination if it is determined to not use the extra up-link resource. The information of this report may be used by NW1 to improve the efficiency of further allocations to UE1.

The determination of step 219 may, for example, comprise determining to not use the extra up-link resource if the interference indication 248 is received. In some embodiments, it may be determined to use the extra up-link resource if the interference indication 249 is received. If no response (i.e. neither of 248 or 249) is received, it may be determined to use the extra up-link resource according to some embodiments.

In some embodiments, it may be deter mined to use the extra up-link resource even if the interference indication 248 is received. In such embodiments, UE1 may, for example, determine to use a lower power level than the first power level for the up-link transmission.

Of course, there could be a plurality of first devices and/or a plurality of second devices, wherein each pair may operate in accordance with the methods of FIG. 2.

Three example scenarios where embodiments are applicable will now be described. Various features of the embodiments of these scenarios may be taken alone and combined with features of any other suitable embodiment. For example, the example selection of frequencies and/or power levels may be applied similarly in other embodiments.

In a first example scenario, a first device determines a need for up-link transmission at a first power level on a first time-frequency resource (which may specify e.g. a carrier frequency F1 and a time instant T1 and/or another type of time-frequency resource). The first device starts to transmit a beacon signal. The beacon signal transmission may preferably, but not necessarily, be done using another carrier frequency F2 (and possibly another Radio Access Technology—RAT). The power level of the beacon transmission may be based on the range of a "dead zone" (see 131 of FIG. 1) around the first device. Thus, the power level of the beacon transmission may be a proportional to the transmit power (e.g. spectral density) used for up-link transmission on F1.

A second device in the vicinity of the first device monitors the carrier frequency where the beacon is transmitted. If the second device detects the beacon signal, it transmits a response signal. The first device receives the response signal, which indicates that there is a second device in vicinity of the first device that might be affected by interference caused by the up-link transmission at first time-frequency resource (F1, T1). The first device determines accordingly to not transmit at time T1 and reports the decision to the network node it is connected to. However, if the second device does not detect the beacon signal, or if the beacon signal is received at the second device with sufficiently low power, it may be concluded that the first device may transmit without disturbing the second device.

In a second example scenario, a first device is connected to a network (NW) node. The up-link transmission takes place on carrier frequency F1 using a first RAT (LTE for instance) and the first device detects a need for extended UL slot allocation (e.g. using a first set of time-frequency resources). The determination may comprise determining that an UL buffer of the first device is full and the first device may request an extended UL slot allocation from the NW node accordingly. Alternatively or additionally, the determination may comprise receiving a request from the NW node. The required TX power (or spectral density, i.e. in dBm/Hz) for the UL transmission is determined either by the first device, by the NW node, or by cooperation between the first device and the NW node.

Then, the first device starts to transmit a beacon signal. The beacon may be transmitted on the same frequency as the up-link transmission or on another carrier F2 (using the same RAT as the cellular communicating or possibly a second RAT, e.g. Win Direct). The choice of RAT may depend on the carrier F2 used for the beacon (e.g. Bluetooth or WiFi Direct for F2 in the ISM band and UMTS LTE for F2 in the cellular spectrum). The beacon signal may comprise information regarding carrier frequency F1, first time-frequency resources and intended TX power of the up-link transmission. The beacon signal may be transmitted with a TX power proportional to the TX power used for transmitting the up-link signal on F1. The proportionality factor may be chosen such that the coverage of the beacon signal is matched with the "dead zone" area of the up-link transmission. Hence, if a second device detects the beacon signal, the second device is within a range from the first device where there is a risk of significant interference caused by the first device (e.g. due to TX leakage) for signal reception at a frequency F3 (which may or may not be the same as F1). The proportionality factor may also or alternatively be based on leakage requirements from the (3GPP) specifications and/or the particular carrier frequencies F1 and F2. Selection of proportionality factor may also include suitable channel models at carrier frequencies F1 and F2 in order to determine a suitable TX power for correct coverage of the beacon. In some embodiments, the TX power of the beacon is constant and the beacon signal indicates a received signal strength threshold (e.g. a value relative to the total signal strength of a beacon signal or a value relative to the signal strength of a reference signal such as a pilot or synchronization signal). If the second device detects the beacon at signal strength above the signal strength threshold, it may conclude that it will be interfered by an up-link transmission of the first device. If the second device detects that there is a risk of interference caused by the first device, it transmits a response signal.

The first device starts to monitor for response signals (e.g. on a carrier at time instances associated with the transmission of the beacon signal) as soon as the beacon transmission starts. In a particular example, the first device also starts to use first time-frequency resource for UL transmission directly after the need is detected. In that case, the monitoring of response signals as well as the transmission of beacon signals may continue during the entire extended UL transmission session. In some examples, the beacon signal may be sent with certain intervals and the response signal monitoring may be adapted correspondingly If no response signal is detected the first device starts (or continues) the up-link transmission using the first time-frequency resource. If a response signal is detected the first device may stop any on-going up-link transmission (or refrain from starting up-link transmission using the first time-frequency resource). The first device may inform the NW node about the response signal detection (e.g. using a time-frequency resource different form the first time-frequency resource).

In a third example scenario, a second device is communicating with a NW node on a carrier F3. It regularly (e.g. on request or reconfiguration from the NW node) monitors a second carrier F2 for beacon signals. In some examples, the monitoring may be started autonomously if the second device detects an interference or synchronization problem in certain DL slots.

If a beacon signal is detected fulfilling certain characteristics, the second device transmits a response signal on a carrier associated to the beacon transmit carrier F2. The certain characteristics may comprise that information included in the beacon signal indicates an interference risk for reception by the second device at a certain time-frequency resource (e.g. F3, T1). Hence, if the received beacon indicates interference risk on a carrier where the second device is not receiving down-link signaling, no response signal should be transmitted. Furthermore, if the beacon signal is detected hut the signal level of the down-link reception from the NW node is high enough (e.g. above a threshold), no response signal should be transmitted.

In some embodiments, the second device may also report the detected beacon signal to the NW node (e.g. using a set of time-frequency resources different from the ones used for the response signal). For example, if the first device estimates its transmission duration and includes that information in the beacon signal, then the second device may inform its NW node accordingly and request that the interfered time-frequency resource for down-link transmission is not used during that duration.

In some embodiments, the second device may include its estimated DL reception duration in the response signal, and the first device may use that information to inform its own NW node accordingly and request that the interfering time-frequency resources for up-link transmission is not used during that duration.

Figure 3:
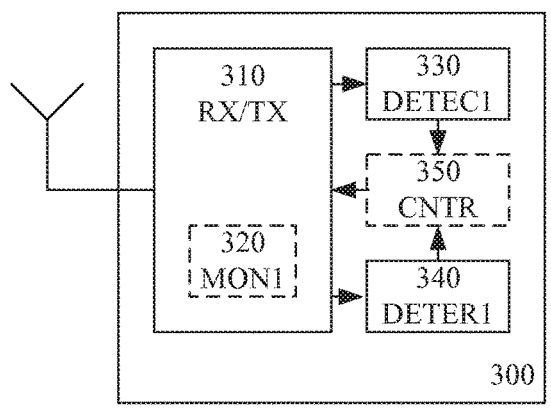
FIG. 3 is a block diagram illustrating an example arrangement according to some embodiments.
Figure 4:
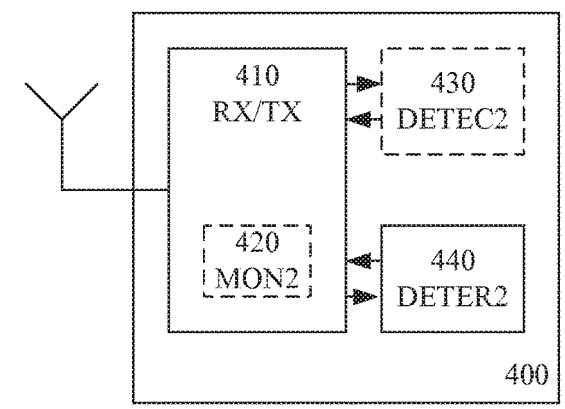
FIG. 4 is a block diagram illustrating an example arrangement according to some embodiments.
Figure 5:
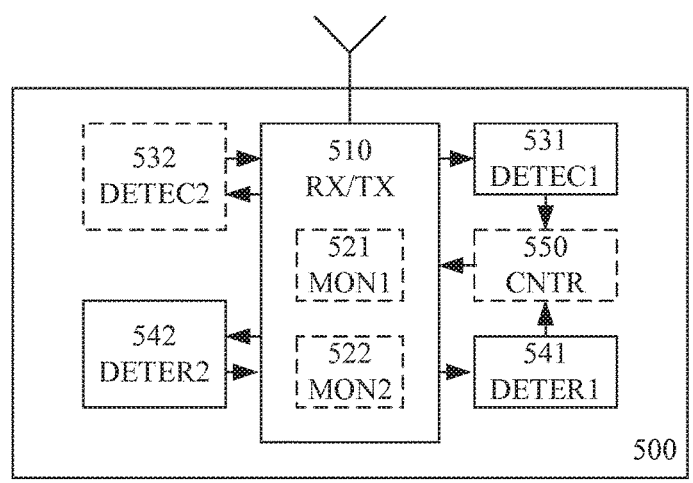
FIG. 5 is a block diagram illustrating an example arrangement according to some embodiments.

FIGS. 3-5 illustrate example arrangements according to some embodiments. FIG. 3 illustrate an arrangement for a first device (compare with the wireless communication device 101 of FIG. 1 and UE1 of FIG. 2), FIG. 4 illustrate an arrangement for a second device (compare with the wireless communication device 102 of FIG. 1 and UE2 of FIG. 2), and FIG. 5 illustrate an arrangement for a device that implement a combination of the functionality of the first and second devices described above.

The arrangement 300 of FIG. 3 may, for example, be adapted to perform the method steps of UE1 as illustrated in FIG. 2 and it comprises a detector (DETEC1) 330, a combined transmitter and receiver (RX/TX) 310, a determiner (DETER1) 340 and—optionally—a controller (CNTR) 350 and a monitor (MON1) 320.

The detector 330 is adapted to detect an intention to use an extra up-link resource (a first time-frequency resource for up-link transmission to the first cellular communication network) for transmission at a first power level (compare with step 211 of FIG. 2), and the transmitter 310 is adapted to perform the up-link transmission (compare with steps 215 and 220 of FIG. 2). The transmitter 310 may also be adapted to transmit a beacon signal using a fourth power level in a fourth time-frequency resource (compare with step 216 of FIG. 2).

The receiver 310 is adapted to receive an interference indication from a second wireless communication device in a third time-frequency resource, wherein the interference indication is indicative of whether or not an interference, caused by the up-link transmission of the first wireless communication device using the first power level and the first time-frequency resource and affecting a down-link reception of the second wireless communication device from a second cellular communication network at a second power level in a second time-frequency resource, has a third power level associated with the first power level that exceeds a power level threshold associated with the second power level (compare with step 218 of FIG. 2). To this end the monitor 320 may be adapted to monitor the third time-frequency resource (compare with step 217 of FIG. 2). The monitor 320 and the receiver 310 may be adapted to perform these activities in response to the transmitter transmitting the beacon and/or performing the up-link transmission.

The determiner 340 is adapted to determine whether or not to use the first time-frequency resource for up-link transmission based on the interference indication (compare with step 219 of FIG. 2).

The transmitter 310 may be further adapted to transmit a report to a network node if it is determined to not use the first time-frequency resource for up-link transmission (compare with step 223 of FIG. 2).

The controller 350 may be adapted to cause the transmitter 310 to start the up-link transmission responsive to the detector 330 detecting the intention to use the extra up-link resource (compare with step 215 of FIG. 2), and to cause the transmitter 310 to stop the up-link transmission (compare with step 221 of FIG. 2) responsive to the determiner 340 determining to not use the first time-frequency resource for up-link transmission.

Alternatively or additionally, the controller 350 may be adapted to cause the transmitter 310 to start the up-link transmission responsive to the determiner 340 determining to use the first time-frequency resource for up-link transmission (compare with step 220 of FIG. 2).

The arrangement 400 of FIG. 4 may, for example, be adapted to perform the method steps of UE2 as illustrated in FIG. 2 and it comprises a detector (DETEC2) 430, a combined transmitter and receiver (RX/TX) 410, a determiner (DETER2) 440 and—optionally—a monitor (MON2) 420.

The receiver 410 is adapted to receive down-link transmissions from a second cellular communication network (compare with step 251 of FIG. 2) and to receive, from a first wireless communication device, a signal indicative of up-link transmission by the first wireless communication device using a first power level and a first time-frequency resource (compare with step 252 of FIG. 2).

The determiner 440 is adapted to determine (based on the received signal indicative of up-link transmission) whether or not an interference, caused by the up-link transmission of the first wireless communication device using the first power level and the first time-frequency resource and affecting a down-link reception of the second wireless communication device from a second cellular communication network at a second power level in a second time-frequency resource, has a third power level associated with the first power level that exceeds a power level threshold associated with the second power level (compare with step 256 of FIG. 2).

The transmitter 410 is adapted to transmit an interference indication to the first wireless communication device using a third time-frequency resource responsive to the determiner determining that the interference has the third power level that exceeds the power level threshold (compare with steps 257 and 258 of FIG. 2). The transmitter may also be adapted to transmit a report indicative of the determination by the determiner 440 to a cellular communication network (compare with step 259 of FIG. 2).

The detector 430 may be adapted to detect impaired down-link reception (compare with step 253 of FIG. 2), and the monitor 420 may be adapted to monitor a fourth time-frequency resource (for a beacon signal indicative of the up-link transmission) in response to the detector 430 detecting the impaired down-link reception (compare with step 254 of FIG. 2).

The arrangement 500 of FIG. 5 is a combination of the arrangement 300 of FIG. 3 and the arrangement 400 of FIG. 4. The arrangement 500 comprises a detector (DETEC1) 532 corresponding to the detector 330, a determiner (DETER1) 541 corresponding to the determiner 340, a controller (CNTR) 550 corresponding to the controller 350, a monitor (MON1) 521 corresponding to the monitor 320, a detector (DETEC2) 532 corresponding to the detector 430, a determiner (DETER2) 542 corresponding to the determiner 440, a monitor (MON2) 522 corresponding to the monitor 420, and a combined transmitter and receiver (RX/TX) 510 corresponding to the combined transmitter and receiver 3110 and to the combined transmitter and receiver 410.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device) comprising circuitry/logic or performing methods according to any of the embodiments. The electronic apparatus may, for example, be a portable or handheld mobile radio communication equipment, a mobile radio terminal, a mobile telephone, a communicator, an electronic organizer, a smartphone, a computer, a notebook, a USB-stick, a plug-in card, an embedded drive, a user equipment (UE), a modem, a sensor, or a mobile gaming device.

Figure 6:
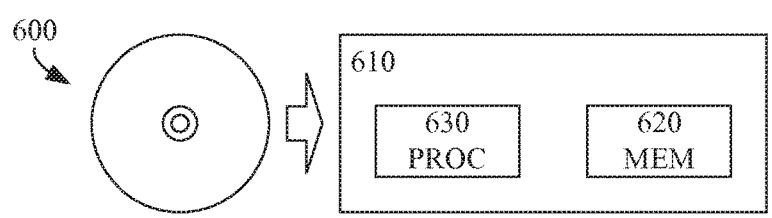
FIG. 6 is a schematic drawing illustrating a computer readable medium according to some embodiments.

According to some embodiments, a computer program product comprises a computer readable medium such as, for example, a diskette or a CD-ROM (such as the CD-ROM 600 illustrated in FIG. 6). The computer readable medium may have stored thereon a computer program comprising program instructions. The computer program may be loadable into a data-processing unit, which may, for example, be comprised in a mobile terminal. When loaded into the data-processing unit, the computer program may be stored in a memory associated with or integral to the data-processing unit. According to some embodiments, the computer program may, when loaded into and run by the data-processing unit, cause the data-processing unit to execute method steps according to, for example, the method shown in FIG. 3.

In the following a number of illustrative embodiments are disclosed as examples 1 to 23.

1. A method for a first wireless communication device adapted to communicate with a first cellular communication network, the method comprising: detecting an intention of the first wireless communication device to use a first power level and a first time-frequency resource for up-link transmission to the first cellular communication network; receiving an interference indication from a second wireless communication device in a third time-frequency resource, wherein the interference indication is indicative of whether or not an interference, caused by the up-link transmission of the first wireless communication device using the first power level and the first time-frequency resource and affecting a down-link reception of the second wireless communication device from a second cellular communication network at a second power level in a second time-frequency resource, has a third power level associated with the first power level that exceeds a power level threshold associated with the second power level; and determining whether or not to use the first time-frequency resource for up-link transmission based on the interference indication.

2. The method of example 1 further comprising starting the up-link transmission using the first power level and the first time-frequency resource before receiving the interference indication, and stopping the up-link transmission using the first power level and the first time-frequency resource if it is determined, based on the interference indication, to not use the first time-frequency resource for up-link transmission.

3. The method of example 1 further comprising starting the up-link transmission using the first power level and the first time-frequency resource if it is determined, based on the interference indication, to use the first time-frequency resource for up-link transmission.

4. The method of any of examples 1 through 3 further comprising monitoring the third time-frequency resource after detecting the intention.

5. The method of any of examples 1 through 3 further comprising transmitting a beacon signal using a fourth power level associated with the first power level in a fourth time-frequency resource after detecting the intention, and monitoring the third time-frequency resource after transmitting the beacon signal, and wherein receiving the interference indication is performed in response to transmitting the beacon signal.

6. The method of any of examples 1 through 5 wherein detecting the intention comprises receiving an up-link allocation of the first time-frequency resource from the first cellular communication network.

7. The method of any of examples 1 through 6 comprising determining to not use the first time-frequency resource for up-link transmission if the interference indication is received.

8. The method of any of examples 1 through 7 further comprising, if it is determined to not use the first time-frequency resource for up-link transmission, transmitting a report indicative of the determination to the first cellular communication network.

9. A method for a second wireless communication device adapted to communicate with a second cellular communication network, the method comprising: receiving, from a first wireless communication device, a signal indicative of up-link transmission by the first wireless communication device to a first cellular communication network using a first power level and a first time-frequency resource; determining whether or not an interference, caused by the up-link transmission of the first wireless communication device using the first power level and the first time-frequency resource and affecting a down-link reception of the second wireless communication device from a second cellular communication network at a second power level in a second time-frequency resource, has a third power level associated with the first power level that exceeds a power level threshold associated with the second power level; and transmitting an interference indication to the first wireless communication device using a third time-frequency resource if it is determined that the interference has the third power level that exceeds the power level threshold.

10. The method of example 9 wherein the signal indicative of the up-link transmission comprises a beacon signal received in a fourth time-frequency resource and further comprising: detecting impaired down-link reception at the second power level in the second time-frequency resource by the second wireless communication device; and monitoring the fourth time-frequency resource.

11. The method of any of examples 9 through 10 further comprising transmitting a report indicative of the determination to the second cellular communication network if it is determined that the interference has the third power level that exceeds the power level threshold.

12. A computer program product comprising a computer readable medium, having thereon a computer program comprising program instructions, the computer program being loadable into a data-processing unit and adapted to cause execution of the method according to any of examples 1 through 11 when the computer program is run by the data-processing unit.

15. An arrangement for a first wireless communication device adapted to communicate with a first cellular communication network, the arrangement comprising: a detector adapted to detect an intention of the first wireless communication device to use a first power level and a first time-frequency resource for up-link transmission to the first cellular communication network; a transmitter adapted to perform the up-link transmission using the first power level and the first time-frequency resource; a receiver adapted to receive an interference indication from a second wireless communication device in a third time-frequency resource, wherein the interference indication is indicative of whether or not an interference, caused by the up-link transmission of the first wireless communication device using the first power level and the first time-frequency resource and affecting a down-link reception of the second wireless communication device from a second cellular communication network at a second power level in a second time-frequency resource, has a third power level associated with the first power level that exceeds a power level threshold associated with the second power level; and a determiner adapted to determine whether or not to use the first time-frequency resource for up-link transmission based on the interference indication.

16. The arrangement of example 15 further comprising a controller adapted to cause the transmitter to start the up-link transmission using the first power level and the first time-frequency resource responsive to the detector detecting the intention to use the first power level and the first time-frequency resource for up-link transmission, and to cause the transmitter to stop the up-link transmission using the first power level and the first time-frequency resource responsive to the determiner determining, based on the interference indication, to not use the first time-frequency resource for up-link transmission.

17. The arrangement of example 15 further comprising a controller adapted to cause the transmitter to start the up-link transmission using the first power level and the first time-frequency resource responsive to the determiner determining, based on the interference indication, to use the first time-frequency resource for up-link transmission.

18. The arrangement of any of examples 15 through 17 further comprising a monitor adapted to monitor the third time-frequency resource responsive to the detector detecting the intention.

19. The arrangement of any of examples 15 through 17 wherein the transmitter is further adapted to transmit a beacon signal using a fourth power level associated with the first power level in a fourth time-frequency resource responsive to the detector detecting the intention, and further comprising a monitor adapted to monitor the third time-frequency resource responsive to the transmitter transmitting the beacon signal.

20. An arrangement for a second wireless communication device adapted to communicate with a second cellular communication network, the arrangement comprising: a receiver adapted to receive, from a first wireless communication device, a signal indicative of up-link transmission by the first wireless communication device to a first cellular communication network using a first power level and a first time-frequency resource; a determiner adapted to determine whether or not an interference, caused by the up-link transmission of the first wireless communication device using the first power level and the first time-frequency resource and affecting a down-link reception of the second wireless communication device from a second cellular communication network at a second power level in a second time-frequency resource, has a third power level associated with the first power level that exceeds a power level threshold associated with the second power level; and a transmitter adapted to transmit an interference indication to the first wireless communication device using a third time-frequency resource responsive to the determiner determining that the interference has the third power level that exceeds the power level threshold.

21. The arrangement of example 20 wherein the signal indicative of the up-link transmission comprises a beacon signal received in a fourth time-frequency resource and further comprising: a detector adapted to detect impaired down-link reception at the second power level in the second time-frequency resource by the second wireless communication device; and a monitor adapted to monitor the fourth time-frequency resource in response to the detector detecting the impaired down-link reception.

22. An arrangement for a wireless communication device comprising the arrangement for the first wireless communication device of any of examples 15 through 19 and the arrangement for the second wireless communication device of any of examples 20 through 21.

23. A wireless communication device comprising the arrangement of any of the examples 15 through 22.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A method for a second wireless communication device configured to communicate with a second cellular communication network, the method comprising:
   receiving, from a first wireless communication device, a signal indicative of up-link transmission by the first wireless communication device to a first cellular communication network using a first power level and a first time-frequency resource;
   determining whether or not an interference, caused by the up-link transmission of the first wireless communication device using the first power level and the first time-frequency resource and affecting a down-link reception of the second wireless communication device from a second cellular communication network at a second power level in a second time-frequency resource, has a third power level associated with the first power level that exceeds a power level threshold associated with the second power level; and
   transmitting an interference indication to the first wireless communication device using a third time-frequency resource if it is determined that the interference has the third power level that exceeds the power level threshold.

2. The method of claim 1 wherein the signal indicative of the up-link transmission comprises a beacon signal received in a fourth time-frequency resource and further comprising:
   detecting impaired down-link reception at the second power level in the second time-frequency resource by the second wireless communication device; and
   monitoring the fourth time-frequency resource.

3. The method of claim 1 further comprising transmitting a report indicative of the determination to the second cellular communication network if it is determined that the interference has the third power level that exceeds the power level threshold.

4. An arrangement for a second wireless communication device that is configured to communicate with a second cellular communication network, the arrangement comprising:
   a receiver configured to receive, from a first wireless communication device, a signal indicative of up-link transmission by the first wireless communication device to a first cellular communication network using a first power level and a first time-frequency resource;
   a determiner configured to determine whether or not an interference, caused by the up-link transmission of the first wireless communication device using the first power level and the first time-frequency resource and affecting a down-link reception of the second wireless communication device from a second cellular communication network at a second power level in a second time-frequency resource, has a third power level associated with the first power level that exceeds a power level threshold associated with the second power level; and
   a transmitter configured to transmit an interference indication to the first wireless communication device using a third time-frequency resource responsive to the determiner determining that the interference has the third power level that exceeds the power level threshold.

5. The arrangement of claim 4 wherein the signal indicative of the up-link transmission comprises a beacon signal received in a fourth time-frequency resource and further comprising:
   a detector configured to detect impaired down-link reception at the second power level in the second time-frequency resource by the second wireless communication device; and
   a monitor configured to monitor the fourth time-frequency resource in response to the detector detecting the impaired down-link reception.

6. An arrangement for a wireless communication device comprising:
   an arrangement for a first wireless communication device; and
   an arrangement for the second wireless communication device of claim 4,
   wherein the first wireless communication device is configured to communicate with a first cellular communication network, the arrangement for the first wireless communication device comprising:
   a detector configured to detect an intention of the first wireless communication device to use a first power level and a first time-frequency resource for up-link transmission to the first cellular communication network;
   a transmitter configured to perform the up-link transmission using the first power level and the first time-frequency resource;
   a receiver configured to receive an interference indication from a second wireless communication device in a third time-frequency resource, wherein the interference indication is indicative of whether or not an interference, caused by the up-link transmission of the first wireless communication device using the first power level and the first time-frequency resource and affecting a down-link reception of the second wireless communication device from a second cellular communication network at a second power level in a second time-frequency resource, has a third power level associated with the first power level that exceeds a power level threshold associated with the second power level; and a determiner configured to determine whether or not to use the first time-frequency resource for up-link transmission based on the interference indication.

7. A wireless communication device comprising the arrangement of claim 4.

* * * * *